(12) United States Patent
Hu et al.

(10) Patent No.: US 8,473,480 B1
(45) Date of Patent: Jun. 25, 2013

(54) CONTINUOUS SECURITY UPDATES

(75) Inventors: Feng Hu, San Jose, CA (US); Phuong Binh Nguyen, Milpitas, CA (US); Hongjun Zhu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 146 days.

(21) Appl. No.: 11/027,786

(22) Filed: Dec. 30, 2004

(51) Int. Cl.
*G06F 7/00* (2006.01)
*G06F 17/30* (2006.01)

(52) U.S. Cl.
USPC ............ 707/708; 707/705; 707/715; 707/741

(58) Field of Classification Search
USPC ........... 711/216; 713/165, 200; 726/1; 707/3, 707/6, 10, 999.1, 705, 708, 715, 741; 709/242
See application file for complete search history.

(56) References Cited

U.S. PATENT DOCUMENTS

| | | | | |
|---|---|---|---|---|
| 6,058,392 A * | 5/2000 | Sampson et al. | ................... | 707/6 |
| 6,321,334 B1 * | 11/2001 | Jerger et al. | ........................ | 726/1 |
| 6,360,215 B1 * | 3/2002 | Judd et al. | ........................ | 707/3 |
| 6,678,683 B1 * | 1/2004 | Shiiyama | ........................ | 707/10 |
| 6,807,632 B1 * | 10/2004 | Carpentier et al. | ........... | 713/165 |
| 7,032,096 B2 * | 4/2006 | Haas et al. | ..................... | 711/216 |
| 2004/0068579 A1 * | 4/2004 | Marmigere et al. | .......... | 709/242 |
| 2004/0162808 A1 * | 8/2004 | Margolus et al. | ................. | 707/1 |
| 2006/0074881 A1 * | 4/2006 | Vembu et al. | ..................... | 707/3 |

* cited by examiner

*Primary Examiner* — Ann Chempakaseril
(74) *Attorney, Agent, or Firm* — Fish & Richardson P.C.

(57) ABSTRACT

Serving a search result is disclosed. A security fingerprint of a security configuration is generated. The security fingerprint is concatenated with a query having a search term and a search result is returned that includes both the search term and the security fingerprint.

25 Claims, 8 Drawing Sheets

| URL Pattern | Credential | Secure? |
|---|---|---|
| google.com/public | | 0 |
| secret.google.com | crawler, cr413r | 1 |
| google.com/docs/ | | 1 |
| google.com/test.html | SAcrawl, h29d!80dja | 0 |
| . . . | . . . | . . . |

Fig. 2

|  | doc304 w/ cred | doc306 | doc308 w/ cred | doc310 | docID ... |
|---|---|---|---|---|---|
| dog | dog |  | dog | dog | ... |
| cat |  | cat |  | cat | ... |
| ... |  |  |  |  | ... |

| u1 |  | u1 | u1 | u1 | ... |
|---|---|---|---|---|---|
| u0 |  | u0 |  | u0 | ... |
|  | doc302 w/ cred | doc304 | doc306 w/ cred | doc308 | docID ... |
| dog | dog |  | dog | dog | ... |
| cat |  | cat |  | cat | ... |
| ... |  |  |  |  | ... |

302

Fig. 3B ations, or any other form that the invention may take, may be
CONTINUOUS SECURITY UPDATES

FIELD OF THE INVENTION

The present invention relates generally to a search appliance. More specifically, a method for updating a security status and providing a search result based on that status is disclosed.

BACKGROUND OF THE INVENTION

Search appliances typically crawl documents and periodically construct and reconstruct indices upon which user queries are performed. The documents crawled may be either public documents, or access controlled documents to which an administrator may wish to limit access to specific users or groups of users. The particular index that a user queries generally changes only periodically. Thus, a user query may be submitted against an index that is potentially days old. During the time interval between when an index is created and when it is replaced with an updated version, an administrator or other party may wish to change the security status of a document in the index from access controlled to public, or vice versa. There exists a need to be able to update the security status of a document between re-indexing periods.

BRIEF DESCRIPTION OF THE DRAWINGS

Various embodiments of the invention are disclosed in the following detailed description and the accompanying drawings.

FIG. 2 illustrates an embodiment of a security configuration.

FIG. 3A illustrates an embodiment of some of the contents of a serving index.

FIG. 3B is a representation of some of the contents of an example serving index with two layers of a sorted map on top.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time and a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
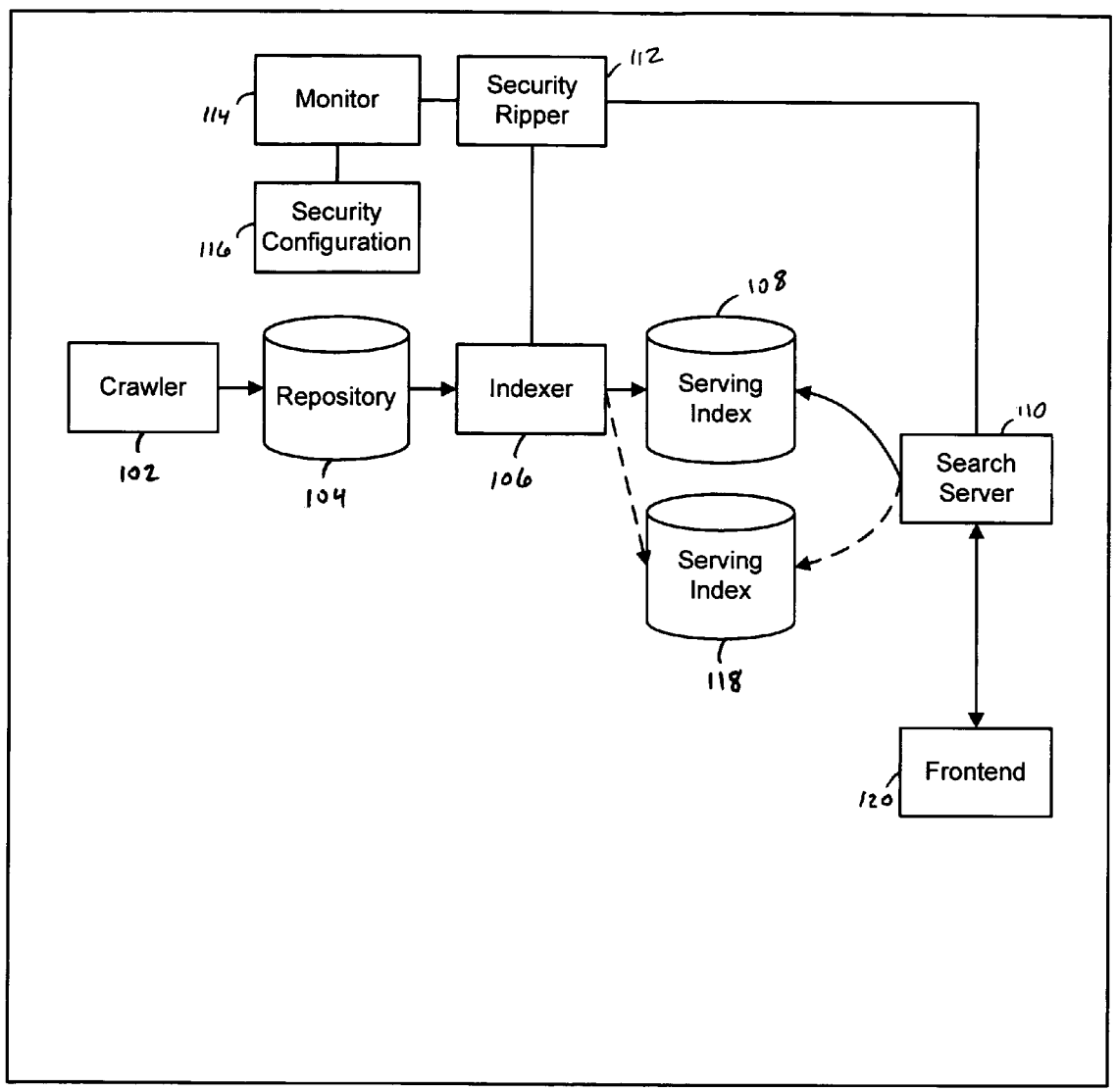
FIG. 1 illustrates an embodiment of a search appliance.

FIG. 1 illustrates an embodiment of a search appliance. In the example shown, a crawler 102, a repository 104, an indexer 106, a serving index 108, a search server 110, a security ripper 112, a monitor 114, and a security configuration 116 are included. As crawler 102 traverses an area, such as a list of URLs on a corporate intranet, it stores the documents that it finds in repository 104. Documents can include Web pages, text files, multimedia files, object features, link structure, and other content. Indexer 106 uses repository 104 to construct a serving index 108. When a user submits a query, such as through frontend 120, search server 110 uses serving index 108 to return results.

Documents can be added or removed from the intranet, and the contents of documents, as well as document attributes can be changed. As time elapses and changes occur on the intranet, serving index 108 can become increasingly out of date. New serving indices are periodically created to keep query results current. To create a new serving index, such as new serving index 118, crawler 102 recrawls its list of URLs, updating the contents of repository 104. Indexer 106 uses the updated contents of repository 104 to create new serving index. Once new serving index 118 is complete, search server 110 ceases consulting serving index 108 and instead uses new serving index 118. Eventually, new serving index 118 is replaced by another new serving index, not pictured.

Security configuration 116 contains information about patterns of URLs contained on the intranet. Security configuration 116 is monitored for changes by a monitor 114. If changes in security configuration 116 are detected by monitor 114, security ripper 112 is notified, as described more fully below.

While the system depicted in FIG. 1 is a search appliance, the claimed invention could be practiced in a variety of information retrieval contexts. For example, intranet search engines, Internet search engines, and intrasite search engines may all replace the system of FIG. 1 or operate in conjunction with the system of FIG. 1.

FIG. 2 illustrates an embodiment of a security configuration. In the example shown, a security configuration, such as security configuration 116, includes a list of URLs and information about those URLs. In the example shown, each line of the security configuration (208-214) contains a URL pattern (202), and a credential (204) and security flag (206) if applicable. The URL pattern can either be a particular document (www.google.com/welcome.html) or a regular expression (*.private.google.com/secure/).

Crawler 102 first attempts to access each document without providing credentials. In this example, crawler 102 crawls an intranet based on a seed list (not pictured). Other methods of crawling could be used by crawler 102, as appropriate. As it crawls, crawler 102 notes in repository 104 whether a credential is required to access a document. If a credential is required to access a document, crawler 102 consults security configuration 116 for the appropriate credential to supply when crawling that page. In the example shown, the credentials are a username/password. In other cases, the credential field may include other types of credentials as appropriate, based on whatever authentication method is employed by that particular URL.

For each URL pattern in security configuration 116, a security flag can be set indicating whether the document(s) matching the URL pattern are unsecured. There are four security states that a particular URL pattern can have. The URL pattern can be marked unsecured and not require a credential (208), secure and require a credential (210), secure and not require a credential (212), and unsecured and require a credential (214).

FIG. 3A illustrates an embodiment of some of the contents of a serving index. In the example illustrated, the serving index, such as serving index 108, is created when indexer 106 rips repository 104. The serving index 108 includes terms 302, such as "dog" and "cat." Each document in serving index 108 has a docID. As represented in FIG. 3A, a document with docID doc304 contains the term "dog," but does not contain the term "cat." Doc306 contains the term "cat," but does not contain the term "dog." Doc310 contains both terms.

New terms can be added into serving index 108 after the indexer has finished ripping the repository by building layers of sorted maps on top of the existing serving index.

FIG. 3B is a representation of some of the contents of an example serving index with two layers of a sorted map on top. In the example shown, an additional term, represented by "u0" was inserted into index 108 after the initial indexing was complete. A term represented by "u1" was added subsequently.

A security fingerprint can be inserted into serving index 108 as an additional term that can indicate whether a document should be returned when a user requests that only unsecured documents be included in results to a query. Each time security configuration 116 changes, a new security fingerprint can be inserted into serving index 108 to indicate which documents should be included in unsecured queries.

In the example shown, "u0" corresponds to a security fingerprint generated by monitor 114 based on the contents of security configuration 116 at the time the serving index is complete. In some embodiments, the security fingerprint is unique. One method for generating a security fingerprint is to take a hash of the security configuration. As discussed more fully below, the security fingerprint may also contain one or more special characters (represented hereinafter as "####"). For example "u0" may be a hash of security configuration 116 concatenated with ####.

Monitor 114 monitors security configuration 116 for changes. One way this can be accomplished is by having monitor 114 continuously calculate a security fingerprint of security configuration 116 and compare it to the previous calculation. If the security fingerprint has changed, that indicates that the configuration file has been changed. As described more fully below, when monitor 114 detects a change in security configuration 116, it sends the new security fingerprint ("u1" in the example shown) to security ripper 112, which uses the updated security configuration 116 and security fingerprint to rip repository 104 and create a log that is read by indexer 106. Based on the log created by security ripper 112, indexer 106 adds a new layer to serving index 108 containing the term u1.

In this example, only one security configuration is used by the system shown in FIG. 1. In other examples, multiple or different methods of crawling may be used and multiple security configurations may be employed. This may be the case, for example, when some of the documents are accessed using a virtual private network, and others are accessed through a single sign on server. If multiple security configurations are used, monitor 114 monitors each security configuration for changes. As discussed more fully below, the security fingerprint generated by monitor 114 is calculated based on the concatenation of the multiple security configurations. If a change is detected in any of the security configurations, the security fingerprint is recalculated based on a new concatenation of the security configurations. For example, if two security configurations ("A" and "B") are used, the security fingerprint is calculated on the concatenation of A and B. If security configuration A changes ("newA"), a new security fingerprint is calculated on the concatenation of newA and B. A new security fingerprint is thus created every time a change is made to any of the security configurations.

Figure 4A:
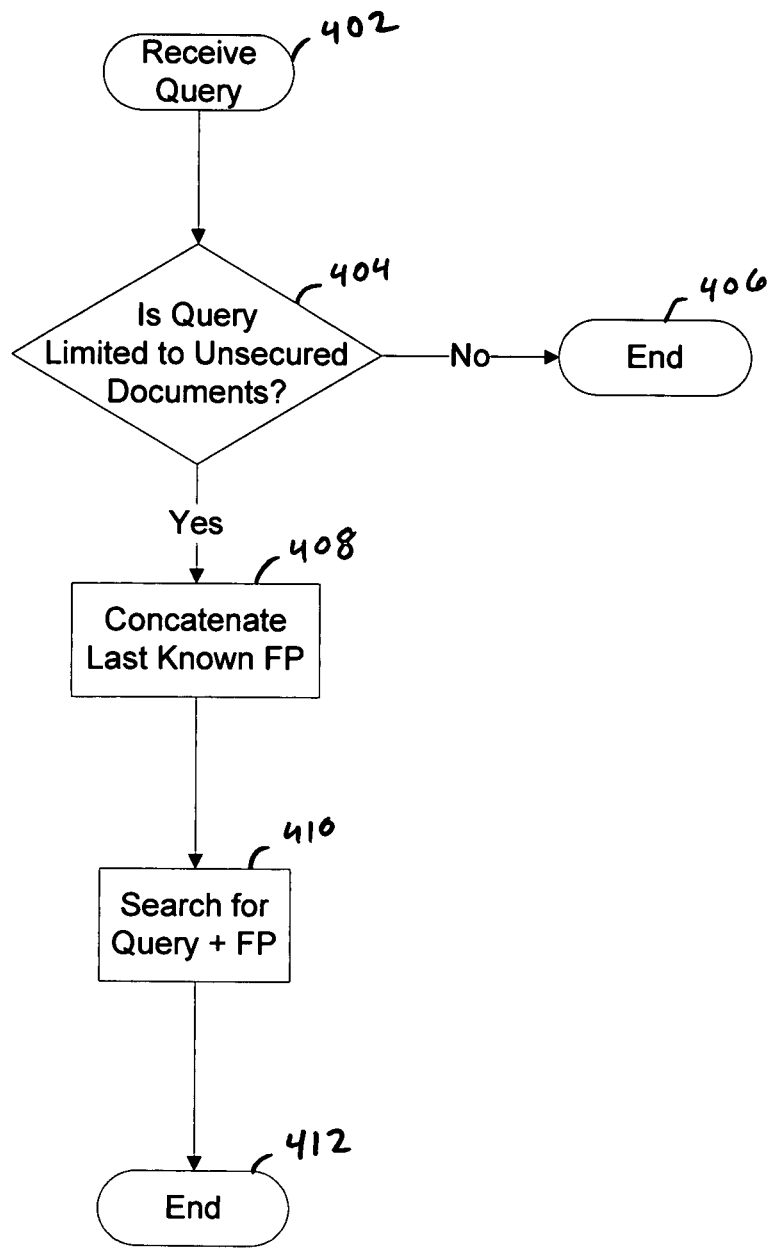
FIG. 4A illustrates an embodiment of a process for delivering content with access control and search capabilities.

FIG. 4A illustrates an embodiment of a process for delivering content with access control and search capabilities. In the example illustrated, a query is received from a user by a search server through a frontend at 402. At 404, it is determined whether the query includes a request to limit the results to unsecured documents, or whether access controlled documents should be provided. If it is determined that both unsecured and access controlled results should be provided, the process ends at 406. In some embodiments, instead of ending the process, methods are employed at 406 to provide access controlled search results as appropriate, as described in U.S. patent application Ser. No. 10/982,407, entitled ACCESS CONTROLLED SEARCH RESULTS filed Nov. 5, 2004, which is incorporated herein by reference for all purposes.

One way that a user can indicate that only unsecured results should be returned is by checking a box, such as "limit results to unsecured documents" in a search window configured to provide such a box. Other methods can be employed as appropriate. If it is determined at 404 that only unsecured results should be returned, at 408, the current security fingerprint is included with the user's query as an additional, mandatory term. For example, when a user requests that a query of the term "dog" be performed and limited to unsecured documents, the search performed on the index is "dog AND <current security fingerprint>."

The current security fingerprint can be incorporated into a query in different ways. One method is to include the security fingerprint itself as a search term. For example, if a hash of the security configuration is 1234XYZ7890, the search could be constructed as "dog AND 1234XYZ7890." A potential problem of this method is that collisions are possible. Specifically, it may be possible for the security fingerprint to appear in a document as a term, coincident to its use in the sorted map to indicate that the document should be made available in unsecured searches. The effect of such a collision could be to make an otherwise secure document, that coincidentally contains the hash value, unsecured.

One method for preventing collisions is to concatenate an additional character or string of characters with the security fingerprint. For example, the additional character or string of characters could be special characters disallowed as a query term. This could occur, for example, if the frontend is configured to discard or reject such characters when submitted with a query. For example, a non printable ASCII character, such as that represented by 007 dec (hereinafter written as "ASCII[007]") could be used as a special character. If a user includes the special term as part of a query, it is removed by the frontend. Characters or strings of characters that do not appear in the index can also be used as special characters. For example, when a document in the repository is indexed, the indexer ignores delimeters such as line return "\n" and that term does not appear in the serving index. Thus, a delimeter such as "\n" could be used as special character ####.

Collisions can also be prevented by using different alphabets for query submissions and indexed terms. For example, a user may be allowed to submit queries in the standard ASCII character set. The search appliance of FIG. 1 can be configured to store documents using a superset alphabet, such as a special alphabet created by adding 1 to the value of each ASCII character but also including the character ASCII[000] and having an extra bit. In such a scenario, a user's input of ASCII[065] corresponds with a character "066" on the system, and frontend 120 is configured to map the user's query to the superset alphabet by adding 1 to each ASCII character. The result is that a user will never be able to successfully submit a query containing ASCII[000], and thus it, too, could be used as special character ####.

Figure 4B:
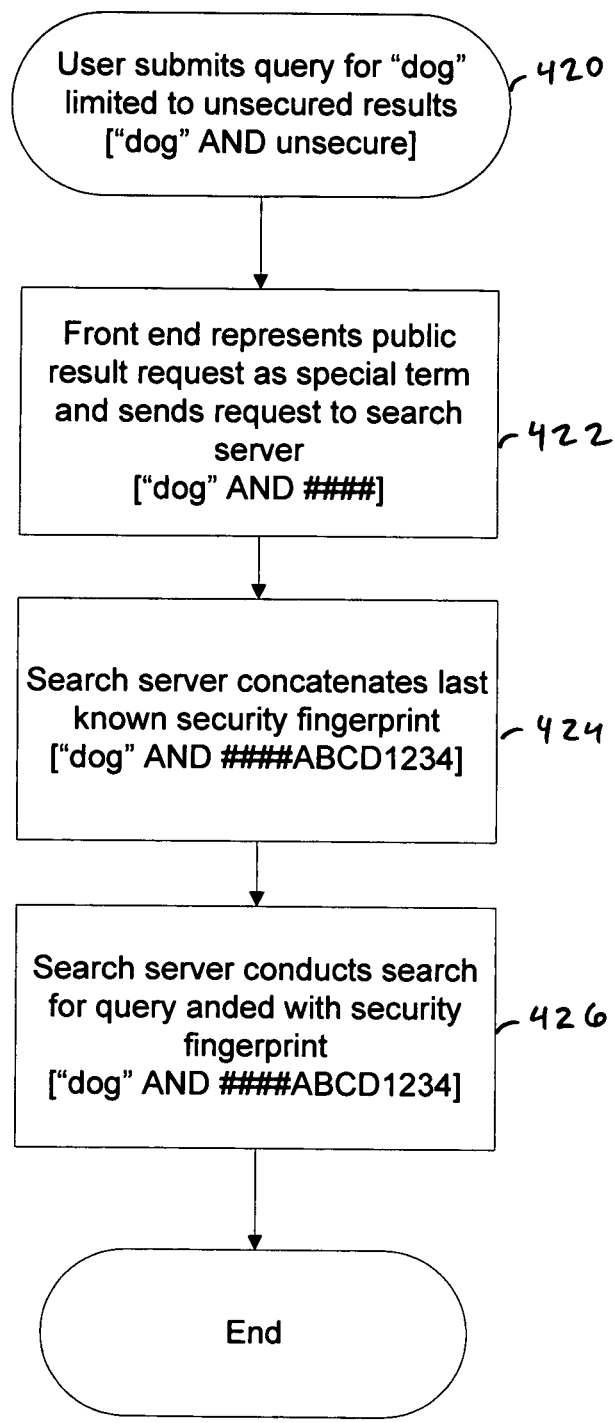
FIG. 4B illustrates an embodiment of a process for requesting unsecured documents.

FIG. 4B illustrates an embodiment of a process for requesting unsecured documents. The process depicted in FIG. 4B could be an example of an implementation of portions of 402, 408, and 410 of FIG. 4A. In the example illustrated, at 420, a user submits to a frontend a query for "dog" that is limited to unsecured results. At 422, the frontend rewrites the query as a request for the term "dog" and a special term for unsecured results represented here as ####, sending the resulting query to a search server. In some embodiments, the special character may be concatenated before the query is submitted to the frontend, such as through use of a special interface. At 424, the search server concatenates the most recent security fingerprint, represented here as ABCD1234, that it has received to the special character, resulting in the query "dog" anded with ####ABCD1234. At 426, the search server conducts a search of the serving index using the terms "dog" and ####ABCD1234.

In some cases, a user may submit a query with multiple terms. If the query is "dog AND cat" it is ultimately rewritten as "dog AND cat AND ####ABCD1234." If the query is "dog OR cat," it is ultimately rewritten as "(dog AND ####ABCD1234) OR (cat AND ####ABCD1234)."

Figure 5:
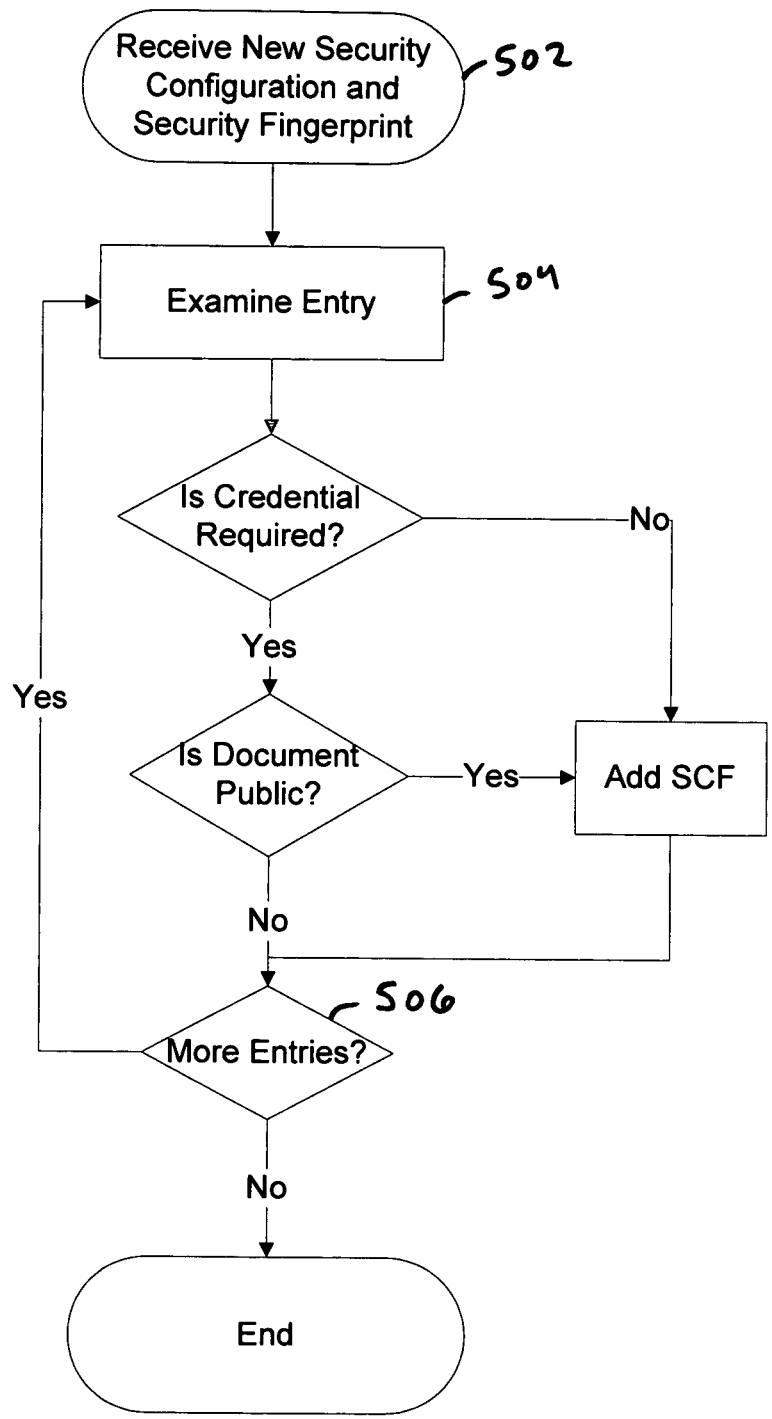
FIG. 5 illustrates an embodiment of a process used by a security ripper to create a log of documents that are currently unsecured.

FIG. 5 illustrates an embodiment of a process used by a security ripper to create a log of documents that are currently unsecured. In the example illustrated, at 502, a security ripper, such as security ripper 112, receives a security configuration and a security fingerprint, for example from monitor 114. At 504, the ripper examines an entry in the received security configuration. If no credential is required, or if the document is marked public, the ripper indicates through a log file that the entry should receive the current security fingerprint as an additional term. If the document requires a credential and is marked secure, the ripper does not make a log entry. In some embodiments, security ripper 112 logs when no security fingerprint should be added to entries, rather than omitting them. At 506, the ripper determines whether there are more entries to check, and returns to 504 as appropriate.

Figure 6:
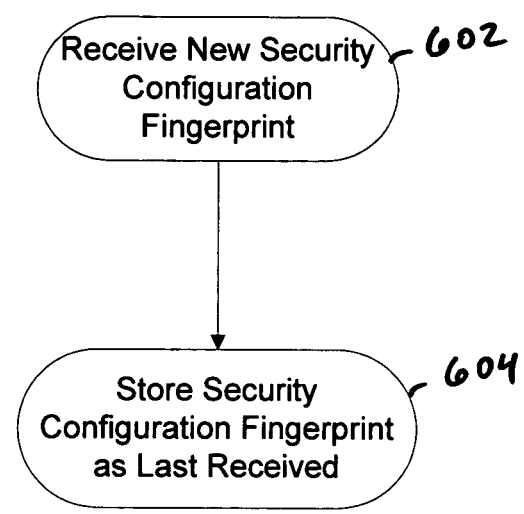
FIG. 6 illustrates an embodiment of a process used by a search server when a security configuration changes.

FIG. 6 illustrates an embodiment of a process used by a search server when a security configuration changes. In the example illustrated, when security configuration 116 changes, monitor 114 calculates a new security fingerprint. At 602, search server 110 is notified of the new security fingerprint, such as via a log. At 604, search server 110 stores the newly received security fingerprint for use, such as in the process of FIGS. 4A and 4B.

Figure 7:
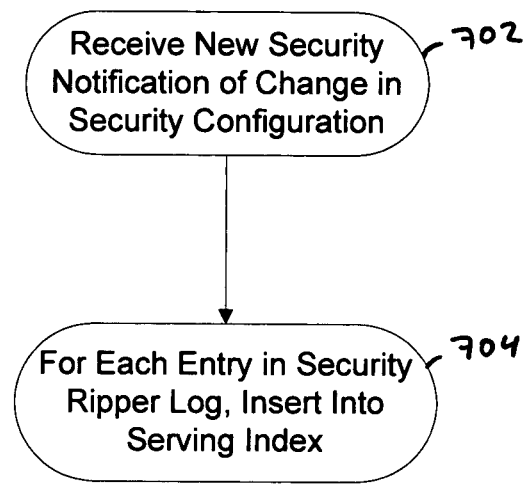
FIG. 7 illustrates an embodiment of a process used by an indexer when a security configuration changes.

FIG. 7 illustrates an embodiment of a process used by an indexer when a security configuration changes. In the example illustrated, when security configuration 116 changes, monitor 114 calculates a new security fingerprint. At 702, indexer 106 is notified that a change has occurred, such as by being notified by a log, such as is generated by security ripper 112 in the process illustrated in FIG. 5. At 704, indexer 106 uses the log to build a sorted map.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method of serving a search result, the method comprising:
    generating with a computer system a security fingerprint by hashing a security configuration, wherein the security configuration: (i) includes patterns of URLs to multiple documents, and (ii) indicates whether each of the multiple documents is unsecured, wherein some of the multiple documents are secured and other of the multiple documents are unsecured;
    adding, in a search engine index, the generated security fingerprint as an indexed term for documents that are unsecured and do not require credentials;
    determining that a computerized device is to receive search results for documents that are unsecured and do not require credentials;
    adding the security fingerprint to a search query that includes a search term and that is from the computerized device;
    returning, in response to the search query, search results that correspond to documents that are associated in the search engine index with the search term and the security fingerprint;
    repeatedly updating the security fingerprint, by hashing the security configuration, to generate an updated security fingerprint;
    determining that the security configuration has changed based on the updated security fingerprint being different than the security fingerprint; and
    providing, in the search engine index and in response to determining that the security configuration has changed, the updated security fingerprint as an indexed term for documents that are unsecured and do not require credentials.

2. The method of claim 1 wherein the security fingerprint is a hash value generated by hashing the security configuration.

3. The method of claim 1 wherein the security fingerprint includes a character that is not allowed in a search query.

4. The method of claim 1 wherein the security fingerprint includes a character that an indexer does not index during an indexing process.

5. The method of claim 4 wherein the character is a delimiter.

6. The method of claim 1 wherein the security configuration is one of a plurality of security configurations, and wherein generating the security fingerprint includes concatenating the plurality of security configurations together and generating the security fingerprint by hashing that concatenation.

7. The method of claim 1 wherein the security fingerprint changes whenever the security configuration is modified.

8. The method of claim 1 further comprising:
    constructing the search engine index,
    constructing a replacement index,
    replacing the search engine index by the replacement index, wherein the providing the updated security fingerprint as the indexed term for documents that are unsecured and do not require credentials occurs at least once during the period between when the search engine index is created and when the search engine index is replaced by the replacement index.

9. The method of claim 6 wherein the security fingerprint changes whenever one of the plurality of security configurations changes.

10. The method of claim 1 further including notifying a security ripper if the security configuration changes.

11. The method of claim 1 wherein the search results are of a plurality of entries in the index.

12. The method of claim 11 wherein for each entry in the index, a security ripper determines whether the security fingerprint should be included as a term.

13. The method of claim 1 further comprising determining whether credentials are required to access a document and associating the security fingerprint with the document in the index based on the result.

14. The method of claim 1 wherein an indexer is notified if the security configuration changes.

15. The method of claim 1 wherein an index server is notified if the security configuration changes.

16. A computer-implemented system for serving a search result in response to a user query, the system comprising:
- a memory configured to store an index of multiple documents, a subset of the documents being associated in the index with a security fingerprint as an added term based on the subset of documents being unsecured and not requiring credentials, wherein some of the multiple documents are secured and other of the multiple documents are unsecured;
- a monitor configured to repeatedly generate the security fingerprint based on a security configuration that includes patterns of URLs to multiple documents and indicates whether each of the multiple documents is unsecured;
- an indexer to update the index of documents when the security fingerprint changes so that the index includes, for documents that are unsecured and do not require credentials, an updated security fingerprint that is generated by the monitor after a change in the security configuration; and
- a search server to receive a query having a search term, determine that search results corresponding to documents that are unsecured and do not require credentials should be returned in response to the query, incorporate the security fingerprint into the query, and return search results corresponding to documents that are associated in the search index with both the security fingerprint and the search term.

17. The system of claim 16 wherein the security fingerprint includes a disallowed character.

18. The system of claim 16 wherein the security fingerprint includes a character that the indexer does not index during an indexing process.

19. The system of claim 16 further comprising a security ripper configured to include the security fingerprint in the index for those documents that are unsecured and do not require credentials.

20. The system of claim 16 further comprising a first index of the multiple documents configured to be replaced by a replacement index of the multiple documents, wherein the security fingerprint changes at least once during the period between when the first index is created and when the first index is replaced by the replacement index.

21. A system for serving a search result comprising:
- an index of multiple documents, a subset of the documents being associated in the index with a security fingerprint based on the subset of documents being unsecured and not requiring credentials;
- means for generating the security fingerprint from a security configuration, wherein the security configuration includes patterns of URLs to multiple documents and wherein the security configuration indicates whether each of the multiple documents is unsecured;
- an indexer to update the index of documents when the security fingerprint changes so that the index includes, for documents that are unsecured and do not require credentials, an updated security fingerprint that is generated after a change in the security configuration; and
- means for incorporating the security fingerprint into a query having a search term and for returning search results based on a search index including the security fingerprint for documents corresponding to the search results.

22. A computer program product for serving a search result, the computer program product being embodied in a non-transitory computer readable medium and comprising computer instructions that when executed by a computer processor perform operations that include:
- generating a security fingerprint from a security configuration, wherein the security configuration: (i) includes patterns of URLs to multiple documents, and (ii) indicates whether each of the multiple documents is unsecured, wherein some of the multiple documents are secured and other of the multiple documents are unsecured;
- adding, in a search engine index, the generated security fingerprint as an indexed term for documents that are unsecured and do not require credentials;
- determining that a computerized device is to receive search results for documents that are unsecured and do not require credentials;
- concatenating the security fingerprint with a query that has a search term and that is from the computerized device;
- returning, in response to the query, multiple search results that correspond to documents that are associated in the search engine index with the search term and the security fingerprint;
- repeatedly updating the security fingerprint, from the security configuration, to generate an updated security fingerprint;
- determining that the security configuration has changed based on the updated security fingerprint being different than the security fingerprint; and
- providing, in the search engine index and in response to determining that the security configuration has changed, the updated security fingerprint as an indexed term for documents that are unsecured and do not require credentials.

23. The computer-implemented method of claim 1 wherein the determining includes receiving, at the computer system and with the query from the computerized device, a request to limit the search results to search results that are unsecured and do not require credentials, and wherein adding the security fingerprint to the search query is performed by the computer system.

24. The system of claim 16, wherein the monitor is configured to generate the security fingerprint by hashing the security configuration.

25. The system of claim 16, wherein the indexer updates the index of search results, every time a change is made to the security configuration, with an updated security fingerprint based on the change being made to the security configuration.

* * * * *

UNITED STATES PATENT AND TRADEMARK OFFICE
CERTIFICATE OF CORRECTION

PATENT NO. : 8,473,480 B2  
APPLICATION NO. : 11/027786  
DATED : June 25, 2013  
INVENTOR(S) : Hu et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 276 days.

Signed and Sealed this  
Third Day of March, 2015

Michelle K. Lee  
*Deputy Director of the United States Patent and Trademark Office*